(12) United States Patent
Parekh et al.

(10) Patent No.: US 11,496,933 B2
(45) Date of Patent: Nov. 8, 2022

(54) METHOD AND APPARATUS FOR UPDATING HANDOVER PARAMETERS IN OPEN-RADIO ACCESS NETWORK (O-RAN) ENVIRONMENT

(71) Applicant: Sterlite Technologies Limited, Gurgaon (IN)

(72) Inventors: Shyam Parekh, Orinda, CA (US); Kevin Tang, Dublin, CA (US); Ravishankar Ravindran, San Ramon, CA (US)

(73) Assignee: Sterlite Technologies Limited, Gurugram (IN)

( * ) Notice: Subject to any disclaimer, the term of this patent is extended or adjusted under 35 U.S.C. 154(b) by 0 days.

(21) Appl. No.: 17/138,963

(22) Filed: Dec. 31, 2020

(65) Prior Publication Data

US 2022/0210708 A1    Jun. 30, 2022

(51) Int. Cl.
*H04W 4/00* (2018.01)
*H04W 36/00* (2009.01)
*H04W 36/22* (2009.01)
*H04W 28/08* (2009.01)
*H04B 17/318* (2015.01)

(52) U.S. Cl.
CPC .... *H04W 36/00837* (2018.08); *H04B 17/318* (2015.01); *H04W 28/0808* (2020.05); *H04W 36/0058* (2018.08); *H04W 36/0094* (2013.01); *H04W 36/00835* (2018.08); *H04W 36/22* (2013.01)

(58) Field of Classification Search
None
See application file for complete search history.

(56) References Cited

U.S. PATENT DOCUMENTS

2021/0184989 A1\* 6/2021 Wu ........................ H04L 47/822

\* cited by examiner

*Primary Examiner* — Suhail Khan
(74) *Attorney, Agent, or Firm* — Steven R. Fairchild; Michael J. Pennington

(57) ABSTRACT

The present invention discloses a method and apparatus for identifying handover requirement by a Radio access network (RAN) controller in open RAN (O-RAN) environment. The O-RAN environment has a virtualized network architecture having at least one RAN controller that is able to control, via an E2 node, a plurality of user equipments (UEs) positioned in a serving cell, a cell covering a location for serving a UE, the serving cell is adjacent to a plurality of neighbour cells. The method includes parallel execution of the operations performed by the RAN controller for each serving cell and each of the neighbor cell and updating CIOs in stepwise i.e., gradually with repeated comparing of the serving cell load parameter with each of the plurality of neighbour cell load parameters and updating the serving cell handover parameter and the plurality of neighbour cell handover parameters based on the comparison.

22 Claims, 5 Drawing Sheets

METHOD AND APPARATUS FOR UPDATING HANDOVER PARAMETERS IN OPEN-RADIO ACCESS NETWORK (O-RAN) ENVIRONMENT

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

Field of the Invention

The present disclosure relates to a wireless communication system, and more specifically relates to a method and apparatus for updating handover parameters in an open-Radio Access Network (O-RAN) environment for load balancing.

Description of the Related Art

As a location of a user equipment (UE) is moved from a service area defined by "X" cell into that defined by "Y" cell, the UE must disconnect with "X" base station and connect with "Y" base station (i.e., establish a new connection). This operation is sometimes known as handover (HO) or a cell reselection. Handover is an important concept in the wireless communication systems in that, particularly, switching of the "X" cell (serving cell) to "Y" cell (target cell/neighbour cell) without dropping the user's session. This handover decision is generally based on a comparison between the strength of the signal from the "X" cell, as received by the UE, and the strength of signals from "Y" cell(s), which are candidates to be a target cell.

Further, a network congestion is a growing problem for wireless network operators. For example, for some UEs, the cell offering the strongest radio reception may also be the most heavily loaded with other UEs who are currently being served. Handing over of still more UEs into that cell shall aggravate the congestion that may already exist. This may result in degraded quality of service, dropping of calls, denial of service, and the like. All of these may result in loss of revenue for the service provide.

Albeit the need of HO, the unnecessarily switching of the serving cell and in case of switching to a loaded cell, in both these cases, there exists wastage of radio resources and decrease in system efficiency. Hence, in order to effectively manage the HO operation, it is vital to monitor the parameters constituting the HO in consideration with load balancing of the cells. The parameters may include, but not limited to, signal strength (RSRP/RSRQ), cell load values, cell individual offset (CIO), hysteresis loss, and the like. Especially, considering the current expansion in the wireless communication networks are becoming increasingly complex and due to introduction of new standards and protocols (such as 5G standards), the monitoring of these parameters in order to effectively utilize the radio resources, is at utmost priority.

One existing technique for providing resource efficient approach for managing the aforementioned parameters, to provide cell load optimization and further to provide Quality of Experience (QoE) for the users in mobile state is a mobility robustness optimization technique such as a self-organizing network (SON). The SON is a collection of functions that automatically monitors network operations (such as congestions), parameters (such as handover parameters) and automatically takes actions to optimize network operations. Although automatically driven, the intellectualization in the SON is limited. That is, the SON operations are performed on an individual cell basis i.e., considering the availability or cell load values or cell received power. Further, the SON operations are not real-time.

Accordingly, there is a need for a technique that improves and/or provide centralized HO management system that overcomes the above shortcomings of the existing centralized HO management systems i.e., SON.

The principal objective of the present invention is to provide a parallel implementation of updating handover parameters (Cell Individual Offsets (CIOs)) for a loaded serving cell with respect to the neighbours and vice versa.

Another objective of the present invention is to implement updating of the handover parameters using a real-time RIC (radio access network intelligent controller) application (i.e., an xApp)) in the O-RAN architecture.

Another objective of the present invention is to provide a parallel implementation the neighbor updating the handover parameters based on the loading at a loaded serving cell and at the neighboring cells.

Another objective of the present invention is to provide a systematic way of incrementally updating the handover parameters.

Accordingly, herein discloses a method for identifying handover requirement by a Radio access network (RAN) controller in open RAN (O-RAN) environment, the O-RAN environment has a virtualized network architecture having at least one RAN controller, the RAN controller is able to control, via an E2 node, a plurality of user equipments (UEs) positioned in a serving cell, a cell covering a location for serving a UE, the serving cell is adjacent to a plurality of neighbour cells. The method includes periodically obtaining a serving cell load parameter and a plurality of neighbour cell load parameters. The method includes periodically comparing the serving cell load parameter with each of the plurality of neighbour cell load parameters, of each of a neighbour cell from the plurality of neighbour cells, wherein both the serving cell load parameter and the plurality of neighbour cell load parameters indicate a plurality of cell load parameters. Further, the method includes periodically calculating serving cell handover parameters with respect to a plurality of neighbour cells and vice versa. Furthermore, the method includes dynamically updating the UEs with the calculated handover parameters. The said steps of both periodically comparing the serving cell load parameter with each of the plurality of neighbour cell load parameters and dynamically updating the serving cell handover parameter and the plurality of neighbour cell handover parameters, are executed parallelly at the serving cell for each of the neighbour cells from the plurality of neighbour cells.

The serving cell load parameter is an average load of the serving cell.

The method for determining if adjustment of the handover parameter with respect to a neighbour is required at the serving cell further comprising comparing the serving cell load parameter with a first predefined threshold and determining that the handover parameter adjustment is not required if the serving cell load parameter is less than the first predefined threshold.

The method for determining, adjustment of the handover parameter with respect to a neighbor, is not required if the serving cell load parameter is less than that of the neighbor.

The method for determining if handover is required by a UE further comprising, checking by the UE, if a predefined handover inequality is satisfied for a specific interval of time, wherein the predefined handover inequality is RSRPt>RSRPs+(Hs−CIOs,t), wherein Hs is the hysteresis parameter for the serving cell, RSRPt is a received signal strength measure neighbour cell t, RSRPs is a received signal strength of the serving cell, CIOs,t is a cell individual offset parameter for the serving cell with respect to the neighbour cell t which is transmitted to the UE by the controller via an E2 node. The predefined handover equality may be checked to identify if A3 event is triggered. The A3 event upon triggering may request for handover of the UE from serving cell to a neighbor cell.

The method for dynamically updating the serving cell handover parameter and the plurality of neighbour cell handover parameters further comprising changing a serving cell CIO with respect to each of the neighbour cells and vice a versa, wherein a serving cell CIO with respect to the neighbour cell may be used for determining if a UE should trigger an event for evaluating a handover from its serving cell to a neighbor cell.

The method further comprises receiving the serving cell load value and the neighbour cell load value for each of the plurality of neighbour cells from a radio network information base (RNIB), wherein the RNIB stores load values of the serving cell and each of the neighbour cells, and other measurements received from a plurality of RANs. wherein the load values comprises a physical resource block (PRB) utilization value.

The method for dynamically updating the serving cell handover parameter with respect to a neighbour cell and vice versa comprises in response to periodically comparing the serving cell load parameter with each of the plurality of neighbour cell load parameters, repeatedly updating a cell individual offset (CIO) value of the serving cell with respect to each of the neighbours and vice versa. Further, the method includes parallelly executing said steps (detailed above) of periodically obtaining, periodically comparing, periodically calculating, dynamically updating and determining of the handover parameters. The determining of the handover requirement comprises determining if the handover is required by the UE to one of the neighbour cells from the plurality of neighbour cells based on the updated CIO value of the serving cell and the updated CIO value of each of the neighbour cell, wherein the CIO value is used for measuring handover trigger for the UE from the serving cell to each of the neighbour cell. The RAN controller (302) may provide the updated serving cell handover parameter and the plurality of neighbour cell handover parameters to the UE (110). The RAN controller (302) may be configured to determine, via the UE, if the handover is required by the UE (110) to one of the neighbour cells (106a/106b . . . 106n) from the plurality of neighbour cells (106a, 106b, . . . 106n) based on updated serving cell handover parameter and the plurality of neighbour cell handover parameters. The UE (110) may further check triggering of A3 event, to determine if handover is required by the UE from the serving cell (102) to one of the neighbour cells (106a/106b . . . 106n) from the plurality of neighbour cells (106a, 106b, . . . 106n).

The method further comprising transmitting a plurality of handover parameters to the serving node, the serving node connected to the UE, wherein the handover parameters are transmitted at a second predefined time interval, wherein the serving cell handover parameter with respect to each of the plurality of neighbour cells and vice versa indicate the plurality of handover parameters.

The, aforementioned steps, of periodically obtaining, periodically comparing, periodically calculating, dynamically updating and determining of the handover requirement are repeated after a first predefined time interval/duration.

The method for identifying handover requirement provides efficient mobile load balancing (MLB).

Accordingly, herein discloses a Radio access network (RAN) controller for identifying handover requirement in open RAN (O-RAN) environment, the O-RAN environment has a virtualized network architecture having at least one RAN controller, the RAN controller is connected with a plurality of E2 nodes, the plurality of E2 nodes are connected to at least one user equipments (UEs) positioned in a serving cell. The RAN controller is further connected to a plurality of virtualized RANs, a serving cell which further comprises a RAN and a plurality of UEs served by it, the serving cell is adjacent to a plurality of neighbour cells. The RAN controller is a near real time RAN intelligent controller (near RT RIC). The RAN controller is configured to periodically obtain a serving cell load parameter and a plurality of neighbour cell load parameters. The RAN controller is configured to periodically compare the serving cell load parameter with each of the plurality of neighbour cell load parameters, of each of a neighbour cell from the plurality of neighbour cells, wherein both the serving cell load parameter and the plurality of neighbour cell load parameters indicates a plurality of cell load parameters. Further, the RAN controller is configured to periodically calculate serving cell handover parameter with respect to each of the neighbor cell from a plurality of neighbor cells and vice versa. Furthermore, the RAN controller is configured to dynamically update the serving cell handover parameters and the plurality of neighbour cell handover parameters based on the calculations. The said steps of both periodically comparing the serving cell load parameter with each of the plurality of neighbour cell load parameters and dynamically updating the serving cell handover parameter and the plurality of neighbour cell handover parameters, are executed parallelly for each of a neighbour cell from the plurality of neighbour cells.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modification.

DESCRIPTION OF THE DRAWINGS

In order to best describe the manner in which the above-described embodiments are implemented, as well as define other advantages and features of the disclosure, a more particular description is provided below and is illustrated in the appended drawings. Understanding that these drawings depict only exemplary embodiments of the invention and are not therefore to be considered to be limiting in scope, the examples will be described and explained with additional specificity and detail through the use of the accompanying drawings in which.

Figure 1:
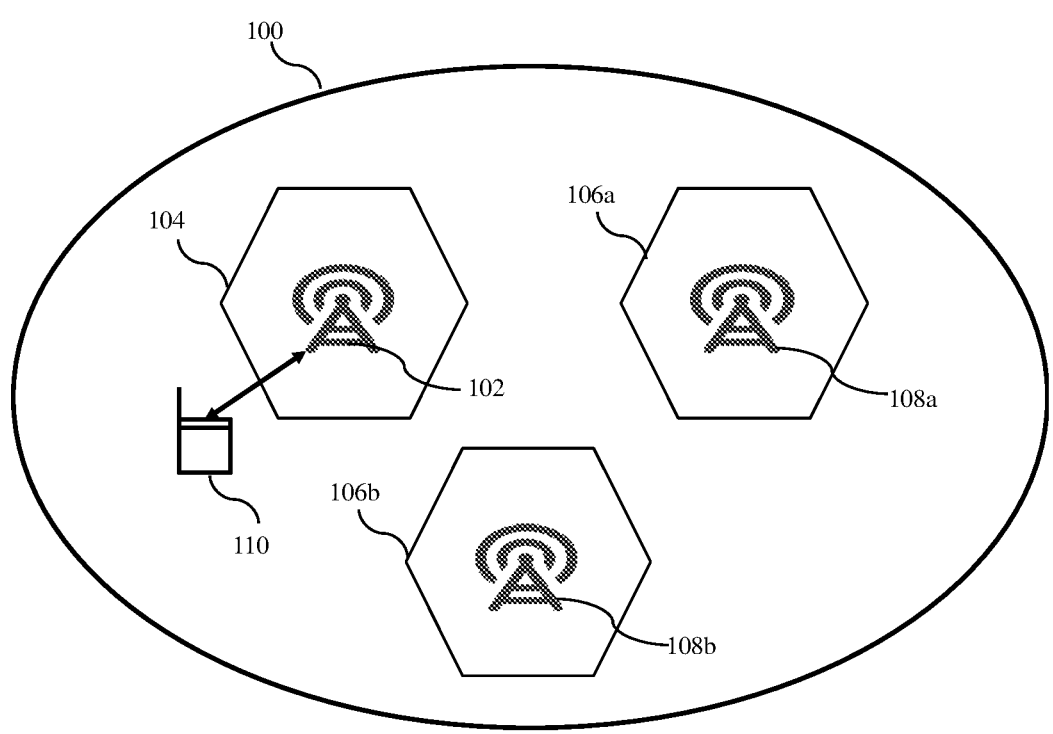
FIG. 1 illustrates a wireless communication network.

It should be noted that the accompanying figures are intended to present illustrations of few exemplary embodiments of the present disclosure. These figures are not intended to limit the scope of the present disclosure. It should also be noted that accompanying figures are not necessarily drawn to scale.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Reference will now be made in detail to selected embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figures are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

It should be noted that the terms "first", "second", and the like, herein do not denote any order, ranking, quantity, or importance, but rather are used to distinguish one element from another. Further, the terms "a" and "an" herein do not denote a limitation of quantity, but rather denote the presence of at least one of the referenced item.

Standard Networking Terms and Abbreviation

RAN: A RAN may stand for radio access network. A radio access network (RAN) may be a part of a telecommunications system which may connect individual devices to other parts of a network through radio connections. A RAN may provide a connection of user equipment such as mobile phone or computer with the core network of the telecommunication systems. A RAN may be an essential part of access layer in the telecommunication systems which utilize base stations (such as e node B, g node B) for establishing radio connections.

Wireless communication system: A wireless communication system may consist of various network components connected via wireless networks. The wireless networks may comprise of any wireless connectivity technology such as radio links, millimeter wave, etc. In this document, the wireless communication system may include one or more controller connected with radio access networks, which are further connected with a plurality of user equipments.

New RAN: A Radio Access Network which can support either NR/E-UTRA or both and have capabilities to interface with Next Generation Core Network (NG-CN). NG-C/U is a Control/User Plane interface towards NG-CN.

gNB: New Radio (NR) Base stations which have capability to interface with 5G Core named as NG-CN over NG-C/U (NG2/NG3) interface as well as 4G Core known as Evolved Packet Core (EPC) over S1-C/U interface.

LTE eNB: An LTE eNB is evolved eNodeB that can support connectivity to EPC as well as NG-CN.

Non-standalone NR: It is a 5G Network deployment configuration, where a gNB needs an LTE eNodeB as an anchor for control plane connectivity to 4G EPC or LTE eNB as anchor for control plane connectivity to NG-CN.

Standalone NR: It is a 5G Network deployment configuration where gNB does not need any assistance for connectivity to core Network, it can connect by its own to NG-CN over NG2 and NG3 interfaces.

Non-standalone E-UTRA: It is a 5G Network deployment configuration where the LTE eNB requires a gNB as anchor for control plane connectivity to NG-CN.

Standalone E-UTRA: It is a typical 4G network deployment where a 4G LTE eNB connects to EPC.

Xn Interface: It is a logical interface which interconnects the New RAN nodes i.e. it interconnects gNB to gNB and LTE eNB to gNB and vice versa.

As per the O-RAN Alliance (O-RAN-WG1 OAM Architecture-v02.00), "the near real time RAN Intelligent Controller (near RT RIC) is a logical function that enables near-real-time control and optimization of O-RAN elements and resources via fine-grained data collection and actions over E2 interface. The Non-Real Time Radio Intelligent Controller (non RT RIC) is a logical function that enables non-real-time control and optimization of RAN elements and resources, AI/ML workflow including model training and updates, and policy based guidance of applications/features in near-RT RIC. It is a part of the Service Management & Orchestration Framework and communicates to the near-RT RIC using the AI interface. Non-RT control functionality (>1s) and near-Real Time (near-RT) control functions (<1s) are decoupled in the RIC. Non-RT functions include service and policy management, RAN analytics and model-training for some of the near-RT RIC functionality, and non-RT RIC optimization. O-CU is O-RAN Central Unit, which is a logical node hosting RRC, SDAP and PDCP protocols. O-CU-CP is O-RAN Central Unit-Control Plane, which is a logical node hosting the RRC and the control plane part of the PDCP protocol. The O-CU-UP is O-RAN Central Unit-User Plane, which is a logical node hosting the user plane part of the PDCP protocol and the SDAP protocol. The O-DU is O-RAN Distributed Unit, which is a logical node hosting RLC/MAC/High-PHY layers based on a lower layer functional split. The O-RU is O-RAN Radio Unit, which is a logical node hosting Low-PHY layer and RF processing based on a lower layer functional split. This is similar to 3GPP's "TRP" or "RRH" but more specific in including the Low-PHY layer (FFT/iFFT, PRACH extraction). The O1 interface is an interface between management entities in Service Management and Orchestration Framework and O-RAN managed elements, for operation and management, by which FCAPS management, Software management, File management shall be achieved. The xAPP is an independent software plug-in to the Near-RT RIC platform to provide functional extensibility to the RAN by third parties." The near-RT RIC controller can be provided different functionalities by using programmable modules as xAPPs, from different operators and vendors.

In the following detailed description of embodiments of the invention, numerous specific details are set forth in order to provide a thorough understanding of the embodiment of invention. However, it will be obvious to a person skilled in the art that the embodiments of the invention may be practiced with or without these specific details. In other instances, well known methods, procedures and components have not been described in details so as not to unnecessarily obscure aspects of the embodiments of the invention.

Furthermore, it will be clear that the invention is not limited to these embodiments only. Numerous modifications, changes, variations, substitutions and equivalents will be apparent to those skilled in the art, without parting from the scope of the invention.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Referring now to the drawings, and more particularly to FIGS. 1 through 6, there are shown preferred embodiments.

FIG. 1 illustrates an example wireless communication network (100) that comprises a base station (102) supporting an associated serving cell (104) and a plurality of neighbour cells (106a, 106b . . . 106n) associated to respective neighbour base stations (108a, 108b . . . 108n). A user equipment (UE) (110) is located within the serving cell (104) and is supported by the base station (102) ("serving base station").

The base station (102) (may include, for example, an access node such as e.g. a Radio Base Station (RBS), also referred to as e.g., evolved Node B ("eNB"), "eNodeB", "NodeB", "B node", gNB, or BTS (Base Transceiver Station), depending on the technology and terminology used. The base station (102) may be a logical node that handles transmission and reception of signals associated with either the serving cell (104) and the neighbour cells (106a-b). The serving cell (104) and the neighbour cells (106a, 106b . . . 106n) may connect to each other via "Xn/X2" interface. The base station (102) and the neighbour base stations (108a, 108b . . . 108n) may connect to one or more antennas, such as the antenna, thus respective base stations may be responsible for the serving cell (104) and the neighbour cells (106a, 106b . . . 106n).

Each of the base stations (102 and 108a, 108b . . . 108n) may further communicate with a core network (not shown) comprising an evolved packet core (EPC) using an "S1" interface. More particularly, the base stations (102 and 108a, 108b . . . 108n) may communicate with a Mobility Management Entity (MME) and a User plane entity (UPE) identified as Serving Gateway (S-GW) using S1-C and S1-U for control plane and user plane, respectively. In another aspect, the core network may correspond to a 5G core.

As will be described below in greater detail, the base station (102) may adapt a triggering threshold, e.g. s-measure, for cell re-selection measurements by the UE (110) in the wireless communication network (100). The expression "cell re-selection" is to be understood as cell change through handover, i.e. cell change when performing handover. Further, the expression "cell re-selection measurements" refer to the measurements for handover during the CONNECTED mode. The cell re-selection measurements may be used by the base station (102) to perform a handover (HO) to transfer a session of the UE (110) to one of the neighbour cells (106a, 106b . . . 106n).

In general, and as defined in the wireless communication standards, the network configures the UE (110) to perform measurements and send measurement reports when certain measurement criteria are met. Based on the measurement reports, the UE (110) is moved, if required and possible, to the most appropriate cell that will ensure the service continuity and quality of service (QoS). On the other hand, the UE (110) measurement report configuration comprises the reporting criteria e.g. whether it is periodic or event triggered, as well as the measurement information that the UE (110) has to report.

For example, in one of the configuration parameters that UE (110) receives from the base station (102) is the parameter "s-measure", which indicates the UE (110) when to start measuring neighbour cells (106a, 106b . . . 106n). If a measured Reference Signal Received Power (RSRP) of the serving cell (104) falls below the s-measure, indicating that the signal of the UE (110) from the serving cell (104) is below threshold (weak), then the UE (110) therefore initiates the measuring the signal strength of reference signals from the neighbour cells (106a, 106b . . . 106n). The configuration parameters to the UE (110) may be provided during the RRC (Radio Resource Control) configuration and/or RRC re-configuration.

While the s-measure determines when the UE (110) starts measuring the neighbour cells (106a, 106b . . . 106n), there are several other measurement configuration parameters that specify the triggering of handover measurement reports from the UE (110). One of such and most common triggered criteria includes "Event A3": Neighbour cell, e.g. cell (106a) or (106b), becomes better than an offset relative to the serving cell (104). The offset values are known as cell indication offset (CIO) defined by the network for each cell and communicated to the UE (110) as one of the measurement configuration parameters (also referred as handover parameters, herein) along with signal strength metrics (Reference Signals Received Power (RSRP)/Reference Signal Received Quality (RSRQ)), hysteresis metrics, and the like.

In case of the condition (known in the art) satisfying for the event A3 remains valid for a certain duration known as Time to Trigger (TTT), the UE sends the measurement report to the serving base station (102). The real-time evaluation of the HO parameters and real time HO using an open-radio access network (O-RAN) architecture is executed in parallel, as described below in greater detail.

In "conventional" HO mechanism, the base station (102) determines the handover requirement by identifying load of the serving cell (104) and target cells (106a, 106b . . . 106n) to perform the handover i.e., based on load values or received power individually. Moreover, according to "conventional" mechanism, change in HO parameters and load comparison for determining the HO requirement are executed sequentially (in any order) which may result in performing the HO of the UE (110) to an inaccurate/incorrect neighbour cell (106a or 106b) and further incurring delay during the HO. Unlike conventional HO mechanism, the proposed HO mechanism provides an intelligent and coordinated parallel processing for handover requirements or stepwise adjustment. That is, the proposed HO mechanism enables the base station (102) (in the O-RAN architecture) to perform a parallel execution of comparing the load changing of parameters together for all the neighbor's cells (106a, 106b . . . 106n) of the serving cell (104).

Figure 2:
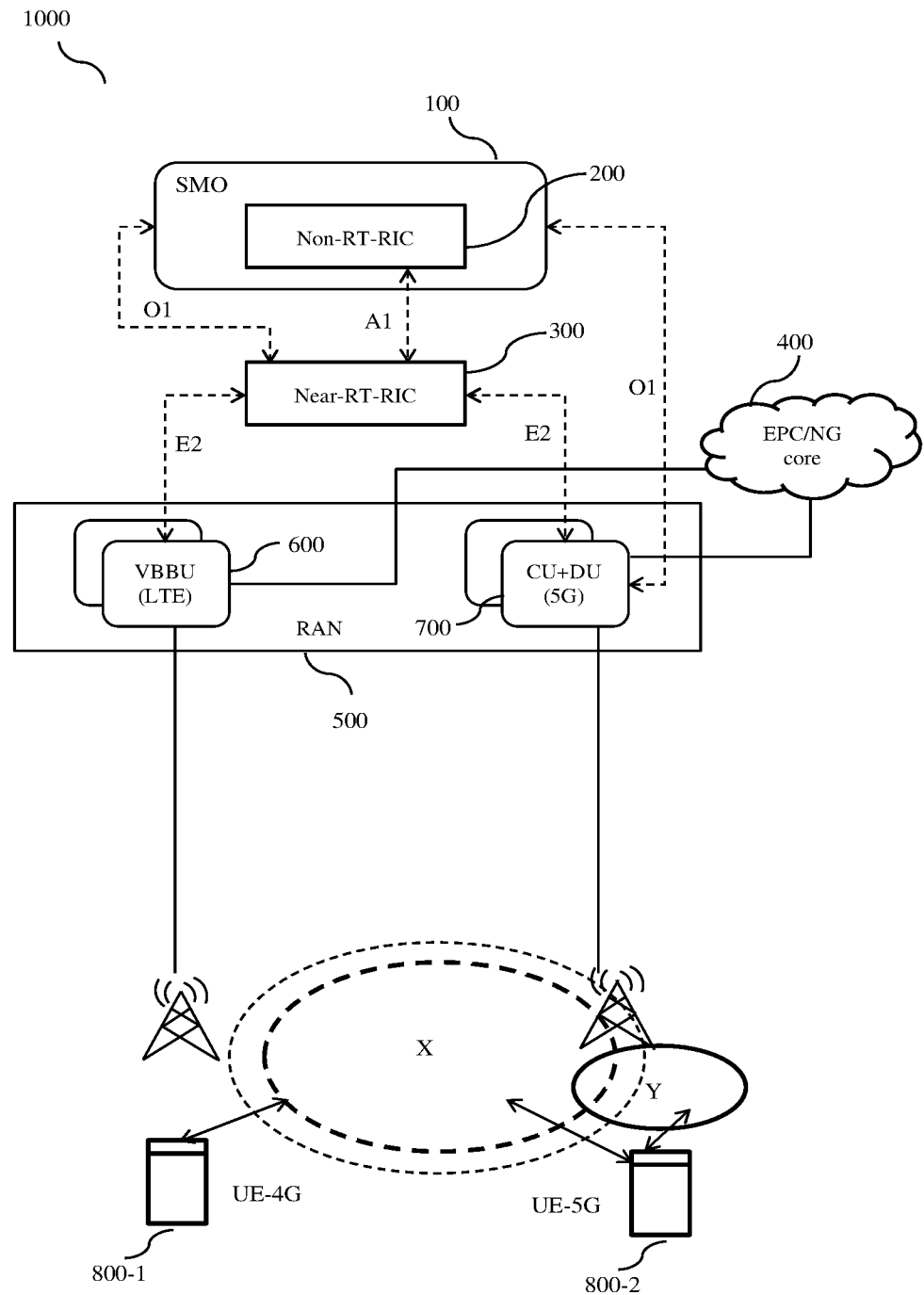
FIG. 2 illustrates an Open-Radio Access Network (O-RAN) architecture.

Referring to FIG. 2 in conjunction with FIG. 1, the Open-Radio Access Network (O-RAN) architecture (200) includes a Service Management and Orchestration (SMO) framework (202) and a radio access network (RAN) intelligent controller (RIC) (210) connected to a RAN (208). The O-RAN is an evolved version of prior radio access networks, makes the prior radio access networks more open and smarter than previous generations. The O-RAN provides real-time analytics that drive embedded machine learning systems and artificial intelligence back end modules to empower network intelligence. Further, the O-RAN includes virtualized network elements with open and standardized interfaces. The open interfaces are essential to enable smaller vendors and operators to quickly introduce their own services, or enables operators to customize the network to suit their own unique needs. Open interfaces also enable multivendor deployments, enabling a more competitive and vibrant supplier ecosystem. Similarly, open source software and hardware reference designs enable faster, more democratic and permission-less innovation. Further, the O-RAN introduces a self-driving network by utilizing new learning based technologies to automate operational network functions. These learning based technologies make the O-RAN intelligent. Embedded intelligence, applied at both component and network levels, enables dynamic local radio resource allocation and optimizes network wide efficiency. In combination with O-RAN's open interfaces, AI-optimized closed-loop automation is a new era for network operations.

The SMO (202) is configured to provide SMO functions/services such as data collection and provisioning services of the RAN (208). As per O-RAN Alliance (O-RAN-WG1 OAM Architecture-v02.00), the SMO can be defined as "Service Management and Orchestration Framework is responsible for the management and orchestration of the managed elements under its span of control. The framework can for example be a third-party Network Management System (NMS) or orchestration platform. Service Management and Orchestration Framework must provide an integration fabric and data services for the managed functions. The integration fabric enables interoperation and communication between managed functions within the O-RAN domain. Data services provide efficient data collection, storage and movement capabilities for the managed functions. In order to implement multiple OAM architecture options together with RAN service modeling, the modeling of different OAM deployment options and OAM services (integration fabric etc.) must be supported by SMO". The RAN (208), herein, is implemented in the O-RAN architecture (200). The RAN (208) may implement a single radio access technology (RAT) (4G/5G) or multiple RATs (4G and 5G) using the base stations (102, 108a, 108b, 108c . . . 108n) located in the wireless communication network (100). The data collection of the SMO framework (202) may include, for example, data related to performance of the wireless communication network (100) and the UE (110).

The base stations (102 and 108a, 108b . . . 108n) may be for e.g. a Radio Base Station (RBS), also referred to as e.g., evolved Node B ("eNB"), "eNodeB", "NodeB", "B node", gNB, or BTS (Base Transceiver Station), depending on the technology and terminology used. In some example, the base stations (102 and 108a, 108b . . . 108n) may be a logical node that handles transmission and reception of signals associated with the plurality of cells. The base station (102) may connect to each other i.e., with the neighbour base stations (108a, 108b . . . 108n) via "Xn" interface either in a same network or to a network node of another network (intra-network). Each base station (102, 108a, 108b . . . 108n) may connect to one or more antennas. The base station (102) may further communicate with the core network (not shown) comprising an evolved packet core (EPC) using an "S1" interface. More particularly, the base station (102) may communicate with a Mobility Management Entity (MME) and a User plane entity (UPE) identified as Serving Gateway (S-GW) using S1-C and S1-U for control plane and user plane, respectively. In another aspect, the core network may correspond to a 5G core.

Referring back to FIG. 2, the RIC (210) can be a non-real-time-radio intelligent controller (Non-RT-RIC) (204) and a near-real-time-radio intelligent controller (Near-RT-RIC) (206). The Non-RT-RIC (204) may be configured to support intelligent RAN optimization in non-real-time. Further, the Non-RT-RIC (204) can be configured to leverage the SMO services and may be a part of the SMO (202). One such advantage of configuring the RAN (208) within the O-RAN computing environment and/or O-RAN architecture (200) is leveraging the intellectualization ("Artificial intelligence (AI/Machine Learning (ML)) of the Non-RT-RIC (204) and the Near-RT-RIC (206).

The Near-RT-RIC (206) may host plurality of xApps, for example, target cell selection-xApp that is configured to select a best candidate cell i.e., target cell, from a plurality of candidate cells for performing the handover. The xApps (at the Near-RT-RIC (206)) uses an "E2" interface to collect near real-time RAN (208) information and to provide value added services using these primitives, guided by the policies/configuration and the enrichment data provided by the "AI" interface from the rApps at the Non-RT-RIC (204). An "O1" interface collects data for training in the Non-RT RIC (204) (integrated with SMO (202)). The AI interface may be defined as an interface between non-RT RIC and Near-RT RIC to enable policy-driven guidance of Near-RT RIC applications/functions, and support AI/ML workflow. The data packets which are communicated over the AI interface may be called AI messages. The E2 interface may be defined as an interface connecting the Near-RT RIC and one or more O-CU-CPs, one or more O-CU-UPs, and one or more O-DUs. The data packets which are communicated over E2 interface may be called E2 messages.

In one example, the "E2" and "A1" interface may be used to collect control messages, subscription messages, policy trigger messages, indication messages, machine learning (ML) management and enrichment information types of messages, and the like. The real-time measurements comprising RSRP/RSRQ measurements, channel quality measurements and the like. The subscription messages such as, for example, RSRP/RSRQ measurement messages, A3 events messages, limited-time based A3 event messages, and the like. The policy trigger messages, for example, spectrum allocation policies, radio assignment policies, and the like.

The O-RAN architecture (200) comprises a virtualized network architecture having at least one RAN controller. The RAN (208), comprising the at least one RAN controller, is able to control, via an E2 node, a plurality of user equipments (UEs) (110) positioned in the serving cell (104) i.e., cell covering a location for serving the UE (110), the serving cell (104) is adjacent to a plurality of neighbour cells (106a, 106b, . . . 106n). The E2 node may be at least one of: an evolved Node B (eNBs) (102), a next generation Node-B (gNBs) (108a), and CU/DU (108b). The CU may be centralized unit and DU may be distributed unit. The RAN controller (302) may be connected with a plurality of E2 nodes (102) (108a) (108b). The plurality of E2 nodes (102) (108a) (108b) may be connected with a plurality of user equipments (110).

Figure 3:
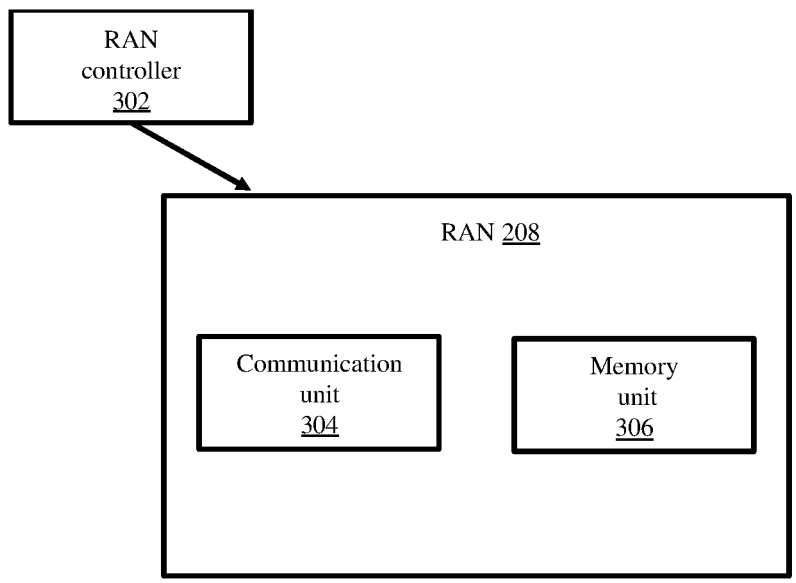
FIG. 3 illustrates various hardware elements in a RAN.

Referring to FIG. 3, in conjunction with FIG. 2, the RAN (208) may be controlled by a RAN controller (302). The RAN may include a communication unit (304), and a memory unit (306). In some example, the RAN controller (302) may be implemented as one or more processors, microprocessors, microcomputers, microcontrollers, digital signal processors, central processing units, state machines, logic circuitries, and/or any devices that manipulate signals based on operational instructions. In another example, the RAN controller (302) may control one or more RANs such as RAN (208). In another example, the RAN controller (302) may reside inside the RAN (208). Among other capabilities, the RAN controller (302) may be configured to fetch and execute computer-readable instructions stored in the memory unit (306). In some other example, the RAN controller (302) may be implemented by the RIC (210) i.e., xApps at the Near-RT-RIC (206) or rApps at the Non-RT-RIC (204).

The communication unit (304) may include interface(s) that is variety of software and hardware interfaces, for example, a web interface, a Graphical User Interface (GUI), a Command Line Interface (CLI) and the like. For example, interface(s) such as ("E2", "O1", "X2", "S1" and the like). The communication unit (304) may be used for configuring the base station (102).

The memory unit (306) may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes.

The base station (102) that serves as a source base station (BS) may be referred as the serving base station (102) and the base stations (108a, 108b, 108c . . . 108n) that may serve as candidate base stations for the selection of the target base station (for e.g., 108a) may be referred as target BS (108a).

Figure 4:
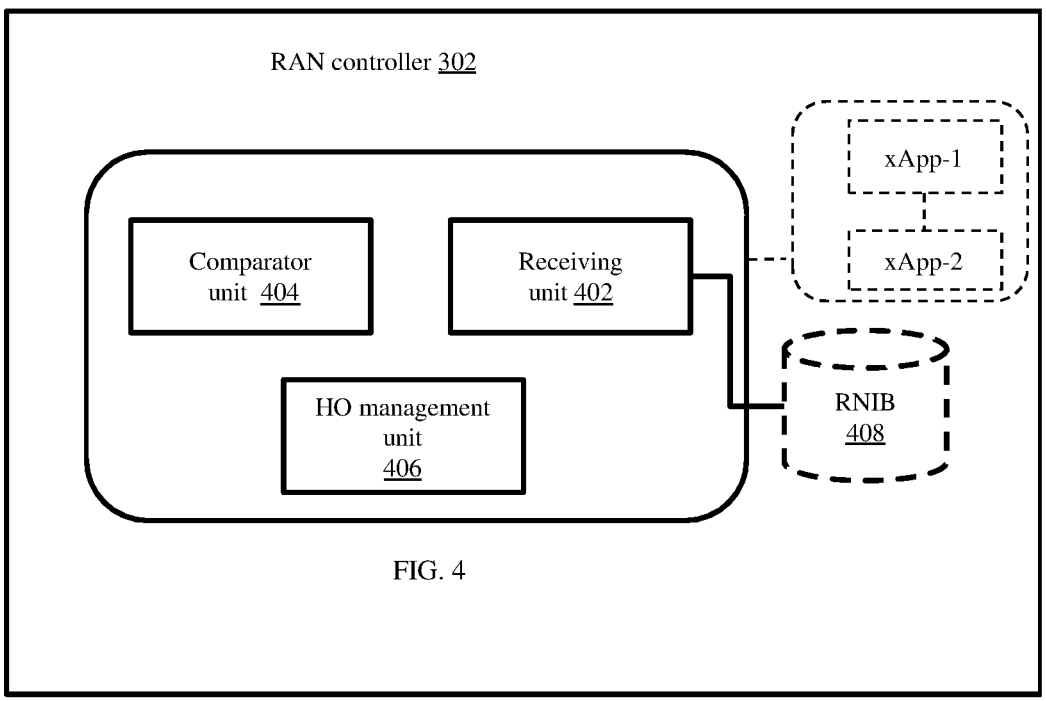
FIG. 4 illustrates various hardware elements in a RAN controller.

Referring to FIG. 4, the RAN controller (302) comprises, for example, a receiving unit (402), a comparator unit (404), a HO management unit (406), and a radio network information base (RNIB) (408).

The RAN controller (302) is configured to execute a plurality of processing threads, each of the plurality of processing thread is executed in parallel and the parallel execution is performed by simultaneous triggering of the processing threads. Further, each of the plurality of processing thread is associated with each neighbour cell of the plurality of neighbour cells (106a, 106b, . . . 106n), where the plurality of processing threads is configured to perform the operations of the RAN controller (302) in accordance with operations performed by each component of the RAN controller (302), described as followed.

In some example, the receiving unit (402) may be configured to receive various types of data and/or control signals (i.e., transmissions) over one or more communication links of a wireless communication system, such as one or more communication links of the wireless communication system (100) described with reference to FIG. 1. In another aspect, the receiving unit (402) may be configured to receive various types of measurements. The receiving unit (402) may receive data and control plane information from a RAN (208). The received information may be utilized by the RAN controller (302) to make a determination as to whether to adjust the handover parameters for the serving base station (102) to the target base station (106a).

For example, the receiving unit (402) can be configured to receive measurement reports (MRs) for cell load measurements. In one example, the MRs may comprise resource load metrics, old/existing/CIO values, and the like, may be obtained from the RNIB (408). The RNIB (408) may be, in one example, a storage unit for old/existing/new CIOs along with corresponding resource load metrics of the serving cell (104) and each of neighbour cells (106a-b) reported by the RAN (208) using the E2 interface. The RNIB (408) may be configured to be located within the Near-RT-RIC (206) or may be externally placed at a server (not shown) and communicate with the Near-RT-RIC (206) using one or more known network interface. In one example, the resource load metrics may include cell utilization values such as Physical Resource Blocks (PRBs) usage (PRBs used and unused values). The PRBs may be allocated by the MAC scheduler during the resource allocation procedure.

The receiving unit (402) can be configured to periodically obtain a serving cell load parameter and a plurality of neighbour cell load parameters. In some example, the serving cell load parameter is an average load of the serving cell (104). In some example, the average load may include value indicating the number of physical resource blocks (PRBs) used (i.e., PRB utilization). The serving cell may be the cell location which is currently serving the UE. The neighbor cells may be all the cells which are adjacent to the serving cell. The serving cell handover parameter may include serving cell CIO (cell individual offset) value with respect to a neighboring cell. The neighboring cell handover parameter for a neighboring cell may include neighboring cell CIO value with respect to the serving cell. The CIO value may be an offset value with the neighbor's measurement value, which may be used for taking handover related decisions. A negative CIO value of serving cell with respect to a neighbor cell may show that the neighbor cell has weaker possibility to provide HO (handover) with that neighbor cell. Similarly, a positive CIO value of the serving cell with respect to the neighbor cell may show that the neighbor cell has high possibility of handover with the neighbor cell.

The comparator unit (404) can be configured to periodically compare the serving cell load parameter, of the serving cell (104) with each of the plurality of neighbour cell load parameters, of each of the neighbour cells (106a/106b . . . 106n) from the plurality of neighbour cells (106a, 106b, . . . 106n). In some example, both the serving cell load parameter and the plurality of neighbour cell load parameters indicate the plurality of cell load parameters.

The HO management unit (406) can be configured to periodically calculate the serving cell handover parameter and a plurality of neighbour cell handover parameters of each of the neighbour cell (106a/106b . . . 106n) from the plurality of neighbour cells (106a, 106b, . . . 106n).

Further, the HO management unit (406) can be configured to dynamically update the serving cell handover parameter and the plurality of neighbour cell handover parameters based on the comparison. In some example, the HO management unit (406), communicatively coupled with the comparator unit (404), can be configured to update the CIO value of the serving cell (104) and the CIO value of each of the neighbour cell (106a/106b . . . 106n) in response to periodically compare the serving cell load parameter with each of the plurality of neighbour cell load parameters, by the comparator unit (404).

In some example, the updating of CIO values is related to dynamic updating of the serving cell handover parameter (i.e., cell handover parameter includes the CIO values). Thus, the CIO values are changed continuously, after comparing load parameters.

Furthermore, the HO management unit (406) can be configured to determine if the handover is required by the UE (110) to one of the neighbour cells (106a/106b . . . 106n) from the plurality of neighbour cells (106a, 106b,106n) based on updated serving cell handover parameter and the plurality of neighbour cell handover parameters. In some example, the updated serving cell handover parameter and the plurality of neighbour cell handover parameters comprises updated CIO value of the serving cell (104) and the updated CIO value of each of the neighbour cell (106a/106b . . . 106n). The CIO value is used for measuring handover trigger for the UE (110) from the serving cell (104) to each of the neighbour cells (106a/106b . . . 106n).

Unlike "conventional" HO mechanism, where the handover parameters procedure is single time/one time process, the proposed invention enables the RAN controller (302) to perform, parallelly on all the plurality of neighbour cells (106a, 106b, . . . 106n), the comparison of neighbour and serving cell loads and consequently updating/changing of the handover parameters (CIOs) in a repeated process, i.e. CIOs or handover parameters are changed in a stepwise manner. CIOs are updated with every iteration whenever the serving cell is loaded and a new neighbour cell is detected which is relatively unloaded. Thereby, ensuring a real-time HO unlike "conventional" centralized/predefined HO mechanism.

In some example, the present invention provides fast and efficient HO mechanism in that aforementioned operations of each of the component of the RAN controller (302) are executed parallelly on each of the neighbour cells (106a/106b . . . 106n) from the plurality of neighbour cells (106a, 106b,106n). Thus, the parallel execution of the operations, as detailed above, increase the efficiency of the HO and achieving improved mobile load balancing (MLB). Further, the present invention also aims at reducing the ping-pong effect during the HO, thereby increasing the quality of the mobile user's connection and reduces the numbers of handovers (by effective determination of HO requirements) which in turn decreases the network load and improves the network performance.

Referring back to FIG. 4, in some example, the comparator unit (404) can be configured to compare the serving cell load parameter with a predefined threshold in order for the HO management unit (406) to determine that whether the handover is required by the UE (110). If the serving cell handover parameter is less than the predefined threshold, then the HO of the UE (110) for MLB (mobile load balancing) purpose is not required. For example, the predefined threshold may be a resource load criterion indicating that the PRB utilization value of the serving cell (104).

In some other example, the comparator unit (404) can be configured to compare if the serving cell load parameter is greater than any of the plurality of neighbour cell handover parameters. If the serving cell load parameter is less than each of the plurality of neighbour cell handover parameters, then the handover parameter adjustment is not performed. The handover parameter adjustment may be updation of CIO values.

In some example, UE (110) is configured to check if a predefined handover inequality is satisfied for a specific interval of time. The predefined handover inequality is RSRPt >RSRPs+(Hs−CIOs,t), where Hs is the hysteresis parameter for the serving cell (104), RSRPt is a received signal strength measure of the each neighbour cell (106a/106b . . . 106n), RSRPs is a received signal strength of the serving cell (104), CIOs,t is a cell individual offset measure of the serving cell (104) with respect to one of the neighbour cells (106a/106b . . . 106n). As per 3GPP ETSI TS 136 214 V9.1.0 (2010-04) technical specification, the RSRP may be defined as "Reference signal received power (RSRP), is defined as the linear average over the power contributions (in [W]) of the resource elements that carry cell-specific reference signals within the considered measurement frequency bandwidth." RSRP may be the power of the LTE Reference Signals spread over the full bandwidth and narrowband.

In some example, the HO management unit (406), in order to dynamically update the HO parameters, is configured to change a serving cell CIO with respect to each of a neighbour cell CIO and change the neighbour cell CIO with respect to the serving cell CIO.

Once, the HO parameters are updated, the communication unit (304) can be configured to transmit the plurality of handover parameters to the serving node (102), the serving node is connected to the UE (110). In some example, the handover parameters are updated at a second predefined time interval, where both the serving cell handover parameter and the plurality of neighbour cell handover parameters indicates the plurality of handover parameters.

The aforementioned operations of the RAN controller (302) is repeated after a first predefined time interval. Hence, by virtue of the parallel operations and the recurrent operations of the RAN controller (302) as detailed above, the Quality of Experience (QoE) and the MLB are improved.

The pre-defined time-interval (first and second) may be, for example, defined as a value in the 10-15 seconds range. In another example, the pre-defined time-interval may be defined by the network operator.

The components of the RAN controller (302) may be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

Figure 5:
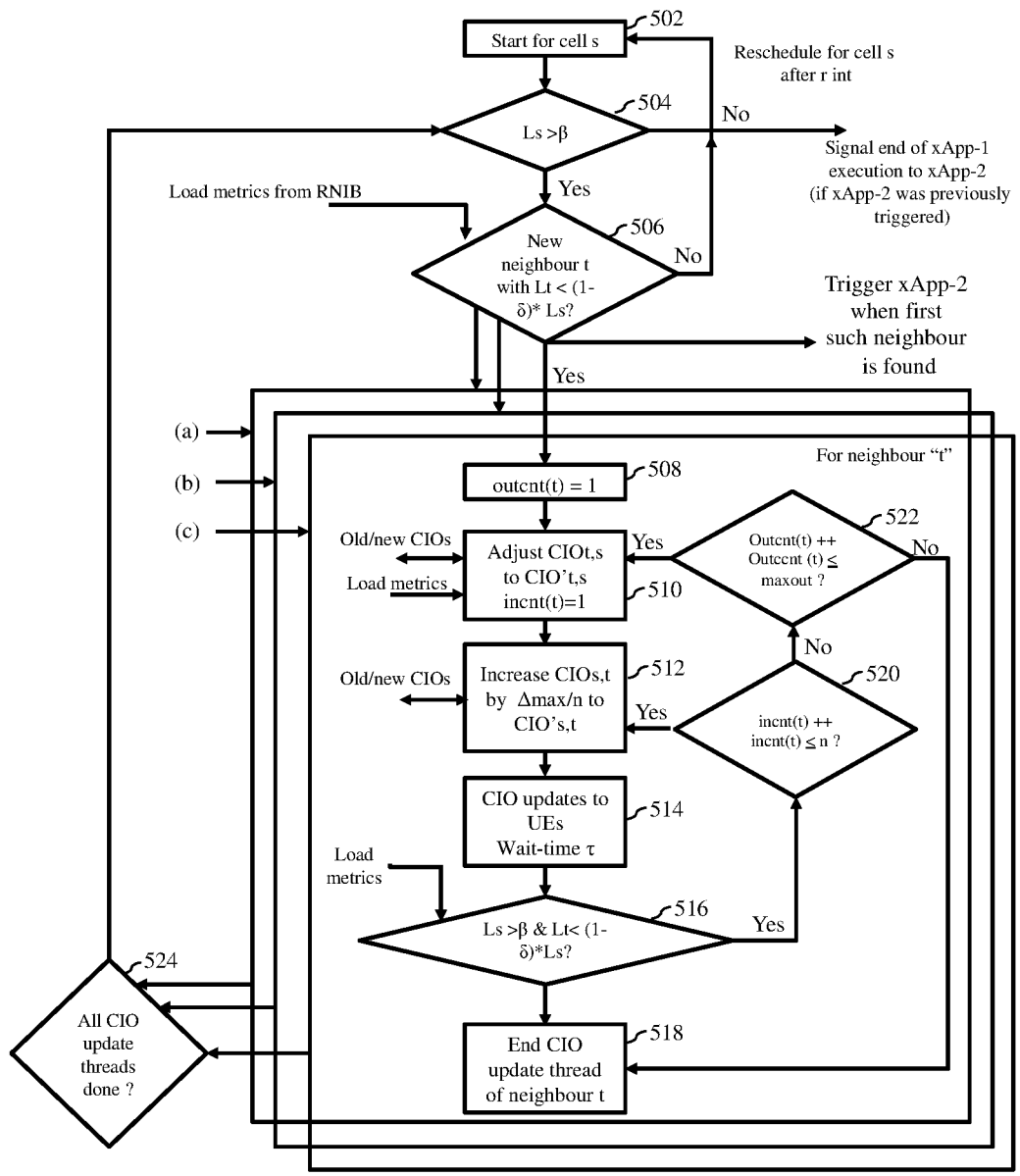
FIG. 5 is a flow chart illustrating a method for updating CIO or handover parameters. The operations are performed by the RAN controller.

As shown in FIG. 5, the HO management unit (406) may be configured to initiate, at step 502, the load determination at the serving cell (104) (represented as "s"). Further, the HO management unit (406) may be configured to determine, at step 504, if the load of the serving cell (104) (also referred as Ls) is greater than a threshold parameter β. The parameter β represents the need for changing the CIO parameter for handing over between the serving cell (104) and each of the neighbour cells (106a, 106b, . . . 106n), as a as a function of the loading at the serving cell (104) and each of the neighbour cells (106a, 106b, . . . 106n). In case, if the load of the serving cell (104), at step 504, is less than the threshold parameter β (i.e., Ls<β), then the HO management unit (406) may terminate the CIO update process.

In case, if the load of the serving cell (104), at step 504, is greater than the proportionality factor β (i.e., Ls>β), then the HO management unit (406) may be configured to (concurrently/parallelly on multiple threads (a)-(c), where each thread is associated with each neighbour cells (106a, 106b, . . . 106n)) determine, at step 506, whether the load of each of the neighbour cells (106a, 106b, . . . 106n) and the serving cell (104) meets the loading threshold criterion. That is (Lt<(1−δ)*Ls), where Lt is load of each of the neighbour cells (106a-b) and a threshold δ is a margin. In one example, the threshold δ is the hysteresis margin for preventing small fluctuations in the relative loading between the cells from causing the CIO value to oscillate. Accordingly, appropriate values for δ may be determined from statistical analysis of historical data and/or obtained from RNIB (408). The average load values for each of the neighbour cells (106a, 106b, . . . 106n) and the serving cell (104) may be obtained from the RNIB (408).

In case, at step 506, the load of each of the neighbour cells (106a, 106b, . . . 106n) and the serving cell (104) fails to meet the resource load threshold criterion i.e., (Lt>(1−δ)*Ls) then the HO management unit (406) may terminate the load determination process for the neighbor cell t and look for another neighbor cell satisfying the loading conditions.

In case, at step 506, the load of each of the neighbour cells (106a, 106b, . . . 106n) and the serving cell (104) meets the resource load threshold criterion i.e., (Lt<(1−δ)*Ls) then the HO management unit (406) may be configured to concurrently update/adjust, at steps 508-512, Repeated adjustment of CIO for t with respect to s is done in the "outer loop" under the control of the local variable "outcnt", and nested in "outer loop", repeated adjustment of CIO for s with respect to t is done in the "inner loop" under the control of the local variable "incnt". the CIO values of each such neighbour cells (106a, 106b, . . . 106n). The average load values and old/existing CIOs values are obtained, from the RNIB (408), and are utilized by the HO management unit (406).

At step 514, the communication unit (304) can be configured to send the updated HO parameters comprising the new CIO values to the UE (110). In one example, new CIOs are stored at the RNIB (408) and also transmitted to the UE (110) with wait period of 1-2 seconds (i.e., second predefined time interval).

At step 516, the HO management unit (406) may be configured to determine if the load of the serving cell (104) meets the conditions Ls>β & Lt<(1−δ)*Ls, if not, then at step 518, HO management unit (406) shall terminate the CIO update process for the neighbor cell t (106a, 106b, . . . 106n). In case, if the load of the serving cell (104) meets the criteria Ls>β & Lt<(1−δ)*Ls, then the HO management unit (406) may be configured to update, at steps 520-522, the CIOs for each of the neighbour cells (106a, 106b, . . . 106n).

At step 524, the HO management unit (406) may be configured to determine if all the CIO values for each of the each of the neighbour cells (106a, 106b, . . . 106n) (executed parallelly on multiple threads (a)-(c)) are completed, if yes, then the HO management unit (406) can be configured to initiate/repeat the operations of steps 504-522.

After a pre-configured time period (10-15 seconds) (i.e., the first predefined time interval) the RAN controller (302) can be configured to reinitiate the operations, as detailed, at the next instance for the cell "s" using the aforementioned steps (502-524) and further for a neighbor cell t. Thereby, ensuring continuous monitoring for each cell and its neighbour cells for their load conditions. Unlike "conventional" mechanism, the propose mechanism enables parallel execution of the aforementioned steps (502-524) for the neighbour cells i.e. parallel CIO updating for each other neighbour cell, by following the pre-configured time intervals.

Unlike "conventional" mechanism, the propose mechanism enables parallel execution of CIO adjustment for each cell in multiple threads. That is by changing CIO values of the serving cell (104) with respect to each of the neighbour cells (106a, 106b, . . . 106n) in a gradually incremental manner (stepwise adjustment), after checking load on the serving cell (104) and the neighbour cells (106a, 106b, . . . 106n) on specific time interval cycle, as described above in steps (502-524).

Figure 6:
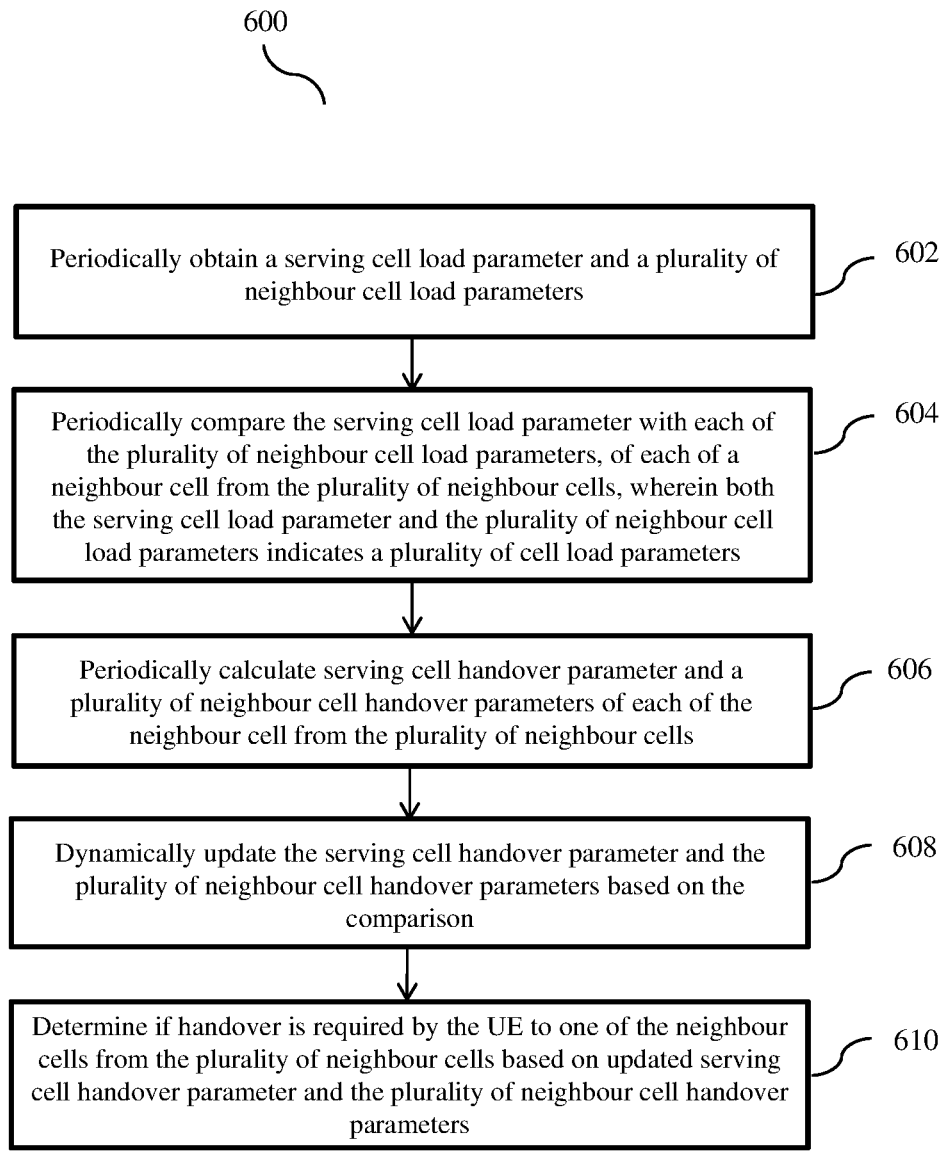
FIG. 6 is a flow chart illustrating a method identifying handover requirement. The operations are performed by the RAN controller.

Referring to FIG. 6 that illustrates a flow chart (600) for parallel identification of HO requirements in the O-RAN environment (200). The operations (602-610) are performed by the RAN controller (302).

At (S602), the method includes periodically obtaining the serving cell load parameter and the plurality of neighbour cell load parameters.

At (S602), the method includes periodically comparing the serving cell load parameter, of the serving cell (104) with each of the plurality of neighbour cell load parameters, of each of the neighbour cell (106a/106b . . . 106n) from the plurality of neighbour cells (106a, 106b, . . . 106n), where both the serving cell load parameter and the plurality of neighbour cell load parameters indicates the plurality of cell load parameters.

At (S606), the method includes periodically calculating the serving cell handover parameter and a plurality of neighbour cell handover parameters of each of the neighbour cell (106a/106b . . . 106n) from the plurality of neighbour cells (106a, 106b, . . . 106n).

At (S608), the method includes dynamically updating the serving cell handover parameter and the plurality of neighbour cell handover parameters based on the comparison.

At (S610), the method includes determining if the handover is required by the UE (110) to one of the neighbour cells (106a/106b . . . 106n) from the plurality of neighbour cells (106a, 106b, . . . 106n) based on updated serving cell handover parameter and the plurality of neighbour cell handover parameters. The RAN controller (302) may provide the updated serving cell handover parameter and the plurality of neighbour cell handover parameters to the UE (110). The RAN controller (302) may be configured to determine, via the UE, if the handover is required by the UE (110) to one of the neighbour cells (106a/106b . . . 106n) from the plurality of neighbour cells (106a, 106b, . . . 106n) based on updated serving cell handover parameter and the plurality of neighbour cell handover parameters. The UE (110) may further check triggering of A3 event, to determine if handover is required by the UE from the serving cell (102) to one of the neighbour cells (106a/106b . . . 106n) from the plurality of neighbour cells (106a, 106b, . . . 106n).

The various actions, acts, blocks, steps, or the like in the flow chart (600) may be performed in the order presented, in a different order or simultaneously. Further, in some embodiments, some of the actions, acts, blocks, steps, or the like may be omitted, added, modified, skipped, or the like without departing from the scope of the invention.

In one aspect of the invention, the present invention may provide a method for parallel execution of dynamically updating the serving cell handover parameters (serving cell CIO with respect to neighboring cells) and neighboring cell handover parameters (neighboring cell CIOs with respect to serving cell). The present method may provide comparing of CIOs values of the serving cell with respect to the neighboring cell and neighboring cell with respect to the serving cell, for dynamically updating the CIO values by stepwise increment of the CIOs. The method may be implemented for each of the neighboring cell in parallel such that real time updation of handover parameters is achieved. The real time updation of handover parameter enables UEs to check triggering of A3 event using updated handover parameters.

The embodiments disclosed herein can be implemented using at least one software program running on at least one hardware device and performing network management functions to control the elements.

It will be apparent to those skilled in the art that other embodiments of the invention will be apparent to those skilled in the art from consideration of the specification and practice of the invention. While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope of the invention. It is intended that the specification and examples be considered as exemplary, with the true scope of the invention being indicated by the claims.

The methods and processes described herein may have fewer or additional steps or states and the steps or states may be performed in a different order. Not all steps or states need to be reached. The methods and processes described herein may be embodied in, and fully or partially automated via, software code modules executed by one or more general purpose computers. The code modules may be stored in any type of computer-readable medium or other computer storage device. Some or all of the methods may alternatively be embodied in whole or in part in specialized computer hardware.

The results of the disclosed methods may be stored in any type of computer data repository, such as relational databases and flat file systems that use volatile and/or non-volatile memory (e.g., magnetic disk storage, optical storage, EEPROM and/or solid-state RAM).

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components or any combination thereof designed to perform the functions described herein. A general-purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

Although the present disclosure has been explained in relation to its preferred embodiment(s) as mentioned above, it is to be understood that many other possible modifications and variations can be made without departing from the spirit and scope of the inventive aspects of the present invention. It is, therefore, contemplated that the appended claim or claims will cover such modifications and variations that fall within the true scope of the invention.

What is claimed is:

1. A method for identifying handover requirement by a Radio access network (RAN) controller in an open-RAN (O-RAN) environment, the O-RAN environment has a virtualized network architecture having at least one RAN controller, the RAN controller is connected with a plurality of E2 nodes, the plurality of E2 nodes are connected with at least one user equipments (UEs) positioned in a serving cell, a serving cell covering a location for serving a UE, the serving cell is adjacent to a plurality of neighbour cells, the method comprising:
   periodically obtaining a serving cell load parameter and a plurality of neighbour cell load parameters;
   periodically comparing the serving cell load parameter with each of the plurality of neighbour cell load parameters, of each of a neighbour cell from the plurality of neighbour cells, wherein both the serving cell load parameter and the plurality of neighbour cell load parameters indicates a plurality of cell load parameters;
   periodically calculating serving cell handover parameter and a plurality of neighbour cell handover parameters of each of the neighbour cell from the plurality of neighbour cells;
   dynamically updating the serving cell handover parameter and the plurality of neighbour cell handover parameters based on the comparison; and
   determining if handover is required by the UE to one of the neighbour cells from the plurality of neighbour cells based on updated serving cell handover parameter and the plurality of neighbour cell handover parameters,
   wherein said steps of both periodically comparing the serving cell load parameter with each of the plurality of neighbour cell load parameters and dynamically updating the serving cell handover parameter and the plurality of neighbour cell handover parameters, are executed parallelly on each of a neighbour cell.

2. The method as claimed in claim 1, wherein the serving cell and neighbor cell load parameters corresponds to average load values of the serving cell and neighbor cell.

3. The method as claimed in claim 1, wherein determining, via the UE, if the handover is required by the UE in the serving cell further comprising:
   comparing the serving cell load parameter with a predefined threshold; and
   determining that the handover is not required if the serving cell handover parameter is less than the predefined threshold.

4. The method as claimed in claim 1, wherein determining, via at least one UE, if the handover is required by the UE in the serving cell further comprising:
   comparing if the serving cell load parameter is greater than each of the plurality of neighbour cell handover parameters; and
   determining that the handover is not required if the serving cell load parameter is less than each of the plurality of neighbour cell handover parameters.

5. The method as claimed in claim 1, wherein determining if handover is required by the UE further comprising:
   checking, at the UE, if a predefined handover inequality is satisfied for a specific interval of time, wherein the predefined handover inequality is $RSRPt > RSRPs + (Hs - CIOs, t)$, wherein Hs is the hysteresis parameter for the serving cell, RSRPt is a received signal strength measure of the each neighbour cell, RSRPs is a received signal strength of the serving cell, CIOs,t is a cell individual offset measure of the serving cell with respect to one of the neighbour cell.

6. The method as claimed in claim 1, wherein dynamically updating the serving cell handover parameter and the plurality of neighbour cell handover parameters further comprising:
   changing a serving cell CIO with respect to each of a neighbour cell, wherein a CIO value is used for determining handover trigger for the UE from the serving cell to each of the neighbour cell; and
   changing the neighbour cell CIO with respect to the serving cell.

7. The method as claimed in claim 1 further comprising:
   receiving the serving cell load value and the neighbour cell load value for each of the plurality of neighbour cells from a radio network information base (RNIB), wherein the RNIB stores load values of the serving cell and each of the neighbour cells, wherein the load values comprises a physical resource block (PRB) utilization value.

8. The method as claimed in claim 1, wherein dynamically updating the serving cell handover parameter and the plurality of neighbour cell handover parameters comprises:
in response to periodically comparing the serving cell load parameter with each of the plurality of neighbour cell load parameters, repeatedly updating a cell individual offset (CIO) value of the serving cell and a CIO value of each of the neighbour cell; and
parallelly executing said steps of periodically obtaining, periodically comparing, periodically calculating, dynamically updating and determining of the handover requirement,
wherein the determining of the handover requirement comprises: determining the updated CIO value of each serving cell with respect to each of the neighbour cells, wherein the CIO value is used for determining handover trigger for the UE from the serving cell to each of the neighbour cell.

9. The method as claimed in claim 1, further comprising: transmitting a plurality of handover parameters to the serving E2 node, wherein the serving E2 node is connected to the UE, wherein the handover parameters are transmitted at a second predefined time interval, wherein both the serving cell handover parameter and the plurality of neighbour cell handover parameters indicates the plurality of handover parameters.

10. The method as claimed in claim 1, wherein said steps of periodically obtaining, periodically comparing, periodically calculating, dynamically updating and determining of the handover requirement are repeated after a first predefined time interval.

11. The method as claimed in claim 1, wherein the method for identifying handover requirement provides a mobile load balancing (MLB).

12. A Radio access network (RAN) controller for identifying handover requirement in open RAN (O-RAN) environment, the O-RAN environment has a virtualized network architecture having at least one RAN controller, the RAN controller is connected with a plurality of E2 nodes, the plurality of E2 nodes are connected with a plurality of user equipments (UEs) positioned in a serving cell, a cell covering a location for serving a UE, the serving cell is adjacent to a plurality of neighbour cells, the RAN controller configured to:
periodically obtain a serving cell load parameter and a plurality of neighbour cell load parameters;
periodically compare the serving cell load parameter with each of the plurality of neighbour cell load parameters, of each of a neighbour cell from the plurality of neighbour cells, wherein both the serving cell load parameter and the plurality of neighbour cell load parameters indicates a plurality of cell load parameters;
periodically calculate serving cell handover parameter and a plurality of neighbour cell handover parameters of each of the neighbour cell from the plurality of neighbour cells;
dynamically update the serving cell handover parameter and the plurality of neighbour cell handover parameters based on the comparison; and
determine if handover is required by the UE to one of the neighbour cells from the plurality of neighbour cells based on updated serving cell handover parameter and the plurality of neighbour cell handover parameters,
wherein said steps of both periodically comparing the serving cell load parameter with each of the plurality of neighbour cell load parameters and dynamically updating the serving cell handover parameter and the plurality of neighbour cell handover parameters, are executed parallelly on each of a neighbour cell.

13. The RAN controller as claimed in claim 12, wherein the serving cell and neighbor cell load parameters corresponds to average load values of the serving cell and neighbor cell.

14. The RAN controller as claimed in claim 12, wherein the RAN controller configured to provide the updated serving cell handover parameter and the plurality of neighbour cell handover parameters to the UE, the RAN controller configured to determine, via the UE, if the handover is required by the UE in the serving cell comprises:
comparing the serving cell load parameter with a first predefined threshold; and
determining that the handover is not required if the serving cell handover parameter is less than the first predefined threshold.

15. The RAN controller as claimed in claim 12, wherein the RAN controller configured to provide the updated serving cell handover parameter and the plurality of neighbour cell handover parameters to the UE, the RAN controller configured to determine, via the UE, if the handover is required by the UE in the serving cell comprises:
compare if the serving cell load parameter is greater than each of the plurality of neighbour cell handover parameters; and
determine that the handover is not required if the serving cell load parameter is less than each of the plurality of neighbour cell handover parameters.

16. The RAN controller as claimed in claim 12, wherein the RAN controller configured to determine, via the UE, if the handover is required by the UE in the serving cell comprises:
checking if a predefined handover inequality is satisfied for a specific interval of time, wherein the predefined handover inequality is RSRPt >RSRPs+(Hs−CIOs,t), wherein Hs is the hysteresis parameter for the serving cell, RSRPt is a received signal strength measure of the each neighbour cell, RSRPs is a received signal strength of the serving cell, CIOs,t is a cell individual offset measure of the serving cell with respect to one of the neighbour cell.

17. The RAN controller as claimed in claim 12, wherein the RAN controller configured to dynamically update the serving cell handover parameter and the plurality of neighbour cell handover parameters comprising:
change a serving cell CIO with respect to each of a neighbour cell, wherein a CIO value is used for determining handover trigger for the UE from the serving cell to each of the neighbour cell; and
change the neighbour cell CIO with respect to the serving cell.

18. The RAN controller as claimed in claim 12, wherein the RAN controller is further configured to:
receive the serving cell load value and the neighbour cell load value for each of the plurality of neighbour cells from a radio network information base (RNIB), wherein the RNIB stores load values of the serving cell and each of the neighbour cells, wherein said load values comprises a physical resource block (PRB) utilization value.

19. The RAN controller as claimed in claim 12, wherein dynamically update the serving cell handover parameter and the plurality of neighbour cell handover parameters, comprises:
in response to periodically compare the serving cell load parameter with each of the plurality of neighbour cell load parameters, repeatedly update a cell individual offset (CIO) value of the serving cell and a CIO value of each of the neighbour cell; and parallelly executing said steps of periodically obtaining, periodically comparing, periodically calculating, dynamically updating and determining of the handover requirement, wherein the determining of the handover requirement comprises: determining, via the UE, if the handover is required by the UE from the serving cell to one of the neighbour cells based on the updated CIO value of the serving cell and the updated CIO value of each of the neighbour cell, wherein the CIO value is used for determining handover trigger for the UE from the serving cell to each of the neighbour cell.

20. The RAN controller as claimed in claim 12, wherein the RAN controller is further configured to transmit a plurality of handover parameters to the serving E2 node, wherein the handover parameters are transmitted at a second predefined time interval, wherein both the serving cell handover parameter and the plurality of neighbour cell handover parameters indicates the plurality of handover parameters.

21. The RAN controller as claimed in claim 12, wherein the said steps of periodically obtaining, periodically comparing, periodically calculating, dynamically updating and determining of the handover requirement are repeatedly after a first predefined time duration.

22. The RAN controller as claimed in claim 12, wherein the RAN controller configured to provide a mobile load balancing (MLB).

\* \* \* \* \*